US010927307B2

(12) United States Patent
Marshall et al.

(10) Patent No.: US 10,927,307 B2
(45) Date of Patent: Feb. 23, 2021

(54) CONTAMINANT REMOVAL METHOD FOR FRACTIONATING COLUMNS

(71) Applicant: GAS LIQUIDS ENGINEERING, Calgary (CA)

(72) Inventors: Derek B Marshall, Calgary (CA); Stuart D MacKenzie, Calgary (CA); Kelly R MacKenzie, Calgary (CA)

(73) Assignee: GAS LIQUIDS ENGINEERING LTD., Calgary (CA)

(*) Notice: Subject to any disclaimer, the term of this patent is extended or adjusted under 35 U.S.C. 154(b) by 320 days.

(21) Appl. No.: 15/941,207

(22) Filed: Mar. 30, 2018

(65) Prior Publication Data

US 2019/0300799 A1 Oct. 3, 2019

(51) Int. Cl.
*C10G 31/08* (2006.01)
*C10G 75/04* (2006.01)
*B01D 3/34* (2006.01)
*B01D 3/32* (2006.01)

(52) U.S. Cl.
CPC ............. *C10G 31/08* (2013.01); *B01D 3/322* (2013.01); *B01D 3/34* (2013.01); *C10G 75/04* (2013.01); *C10G 2300/4075* (2013.01); *C10G 2300/805* (2013.01)

(58) Field of Classification Search
CPC .. C10G 31/08; C10G 75/04; C10G 2300/805; C10G 2300/4075; B01D 3/34; B01D 3/322; B01D 1/28; B01D 5/006
See application file for complete search history.

(56) References Cited

U.S. PATENT DOCUMENTS

| 4,082,653 | A | * | 4/1978 | DeGraff | C10G 7/00 208/251 R |
| 4,375,387 | A | * | 3/1983 | deFilippi | B01D 3/143 196/134 |
| 4,555,311 | A | * | 11/1985 | Ward | B01D 3/143 203/21 |

* cited by examiner

*Primary Examiner* — Randy Boyer
*Assistant Examiner* — Juan C Valencia
(74) *Attorney, Agent, or Firm* — Paul Sharpe; The Sharpe Group

(57) ABSTRACT

Methods for removing water and/or dissolved and solid contaminants from a liquid hydrocarbon such as condensate flowing through a fractionating column are disclosed. Pressure within the column and temperature at which the reboiler operates are observed to prevent boiling of the contaminated hydrocarbon thus obviating contaminant deposition on heated surfaces. Further methods directed to column operation and anti-fouling procedures augment the core method. Apparatus to effect the methods is also provided.

28 Claims, 5 Drawing Sheets

CONTAMINANT REMOVAL METHOD FOR FRACTIONATING COLUMNS

FIELD OF THE INVENTION

The present invention relates to contaminant removal from raw hydrocarbon liquids and more particularly, the present invention relates to a contaminant removal method and apparatus using a fractionating platform.

BACKGROUND OF THE INVENTION

Raw hydrocarbon liquids entering a facility, such as condensate, often carry entrained water and dissolved and/or free solid contaminants along with them as a result of the extraction process and ground conditions found in the area of production. In order to turn these raw liquids into a sales product at a facility, these raw hydrocarbon liquids must be sent through a fractionating column in order to strip away the light hydrocarbon ends.

The reboiler temperatures required to process these raw hydrocarbon liquids cause any water carried over from the feed separator at the inlet of the system to boil off, which deposits any dissolved salts contained in the water on the outside of the tubes located inside the reboiler shell. Over time, this build up causes reduced performance of the reboiler, and will eventually cause failure due to fouling, or tube rupture due to the volume of solid contaminant causing mechanical failure of the reboiler tubes.

The water/contaminant mixture in the hydrocarbon liquid stream can also cause corrosion to the internal components of the tower and the reboiler if constantly recycled throughout the system. Entrained water that boils off in the column reboiler is sent back to the tower in the vapour stream as steam, where it condenses within the tower and exits with the column bottoms, to be boiled off in the reboiler again. Therefore, it is imperative that the bulk of the water and contaminant entrained in the liquid hydrocarbon be removed from the system to avoid process shutdowns and maintenance costs caused by corrosion and/or contaminant build-up.

In light of the fact that processing of unconventional oil and natural gas reserves is a new development, mitigating solutions have not been proposed with any real result. The industry is still in the position that the fouling surfaces are simply rinsed for salt/contaminant removal.

Clearly, this is a procedure which exacerbates the issue. There is significant downtime for cleaning with the disassembly, reassembly, and ramp up for the apparatus in the fractionating circuit inter alia. Economics in terms of production costs are commensurately unappealing.

Unconventional oil reserves contain non-hydrocarbon impurities/contaminants (water, metals, sand, salt) in larger quantities than conventional reserves and the contaminants are found throughout the liquid hydrocarbon. Accordingly, processing in a logistically and economically effective manner is complex and requires elegant management of process parameters.

The present invention has resulted in an effective method and fractionation apparatus modifications to successfully provide saleable processed liquid hydrocarbon while ameliorating equipment fouling.

SUMMARY OF THE INVENTION

One object of the invention is to add, isolate and remove water that is present in the liquid hydrocarbon within the fractionating tower without affecting the overall economics.

Another object of one embodiment of the present invention is to provide a method of extracting contaminants from a feed stream containing liquid hydrocarbons, contaminants and water, comprising:

providing a fractionating circuit;
passing the feed stream into the fractionating circuit;
maintaining pressure and temperature in the circuit at levels suitable to prevent boiling of the feed stream;
isolating water, contaminant and mixtures thereof from the liquid hydrocarbons; and
removing isolated water, contaminant and mixtures thereof from the circuit.

In the case where salt and salt compounds are present in the contaminant fouling, the salt is preferentially absorbed by water. This provides an opportunity to remove the water with the additional benefit or removing the salt. Generally, water is typically a small percentage (1-5%) of the overall liquid hydrocarbon stream.

Another object of one embodiment of the present invention is to provide a method of reducing salt fouling from a feed stream containing hydrocarbon liquids, salt and water in a fractionating circuit having a feed separator, tower and fractionating tower and reboiler, comprising:

feeding the feed stream into the feed separator to form a secondary feed stream;
feeding the secondary feed stream into the tower; and
maintaining pressure in the tower and temperature in the reboiler to prevent boiling of the secondary feed stream.

In the prior art, deposition/fouling simply occurred and was rinsed off the affected components. There was no recognition of circuit control in terms of pressure and temperature to mitigate deposition.

A still further object of one embodiment of the present invention is to provide a fractionating apparatus circuit for extracting contaminant from a feed stream containing liquid hydrocarbons, contaminant and water, the apparatus including a fractionating tower and reboiler comprising:

a secondary separator positioned in fluid communication with the fractionating tower and the reboiler.

The addition of the secondary separator as stated within the circuit has been found to have a significant result in contaminant management within the circuit as will be evident from the data to be presented herein. This is further augmented with the recognition of the effect of the temperature and pressure parameters to prevent boiling. Conveniently, the secondary separator addition is envisioned for retrofit applications in existing prior art circuits.

In this manner, it is thus a further object of one embodiment of the present invention is to provide a fractionating apparatus circuit for extracting contaminant from a feed stream containing liquid hydrocarbons, contaminant and water, comprising:

a feed separator for initial separation of contaminant from the feed stream;
a fractionating tower for hydrocarbon separation;
a feed/bottoms exchanger for conditioning the feed stream prior to treatment in the fractionating tower;
a reboiler for maintaining temperature in said circuit; and
a secondary separator in fluid communication with the reboiler and a bottom of the fractionating tower.

In view of the versatility of the methodology, the individual featured unit operations may be singly or selectively combined to practise the technology. As an example, the method of extracting contaminants from a feed stream containing liquid hydrocarbons, contaminants and water, which includes passing a feed stream into a fractionating circuit, while maintaining pressure and temperature in the circuit at levels suitable to prevent boiling of the feed stream, isolating water, contaminant and mixtures thereof from the liquid hydrocarbons and removing isolated water, contaminant and mixtures thereof from the circuit may include some or all of the following practised in sequence with the above described method for multiple methods. The additional steps include:

A) step of providing a separator in said circuit for separating liquid hydrocarbons, contaminant and water;
B) introducing fresh water at predetermined positions in said circuit;
C) recycling separated contaminant from said separator into said feed stream to be treated;
D) introducing an additive to increase contaminant solubility in said feed stream;
E) treating mechanical components in said fractionating circuit to reduce contaminant accretion;
F) operating a fractionating column in said circuit in three phase mode to increase mixing for augmented contaminant removal; and
G) treating overhead vapours from a stabilizing tower in the fractionating circuit.

Advantages of the technology set forth herein include, for example:

increased production/increased revenue/reduced down time
reduced maintenance costs (equipment and labour costs)
reduced fouling downstream (in tower and downstream of tower)
reduced operating costs;
reduced load on hot oil system,
reduced utility costs; and
reduced capital expenditure Having thus generally described the invention, reference will now be made to the accompanying drawings.

BRIEF DESCRIPTION OF THE DRAWINGS

Similar numerals used in the Figures denote similar elements.

DETAILED DESCRIPTION OF THE PREFERRED EMBODIMENTS

Figure 1:
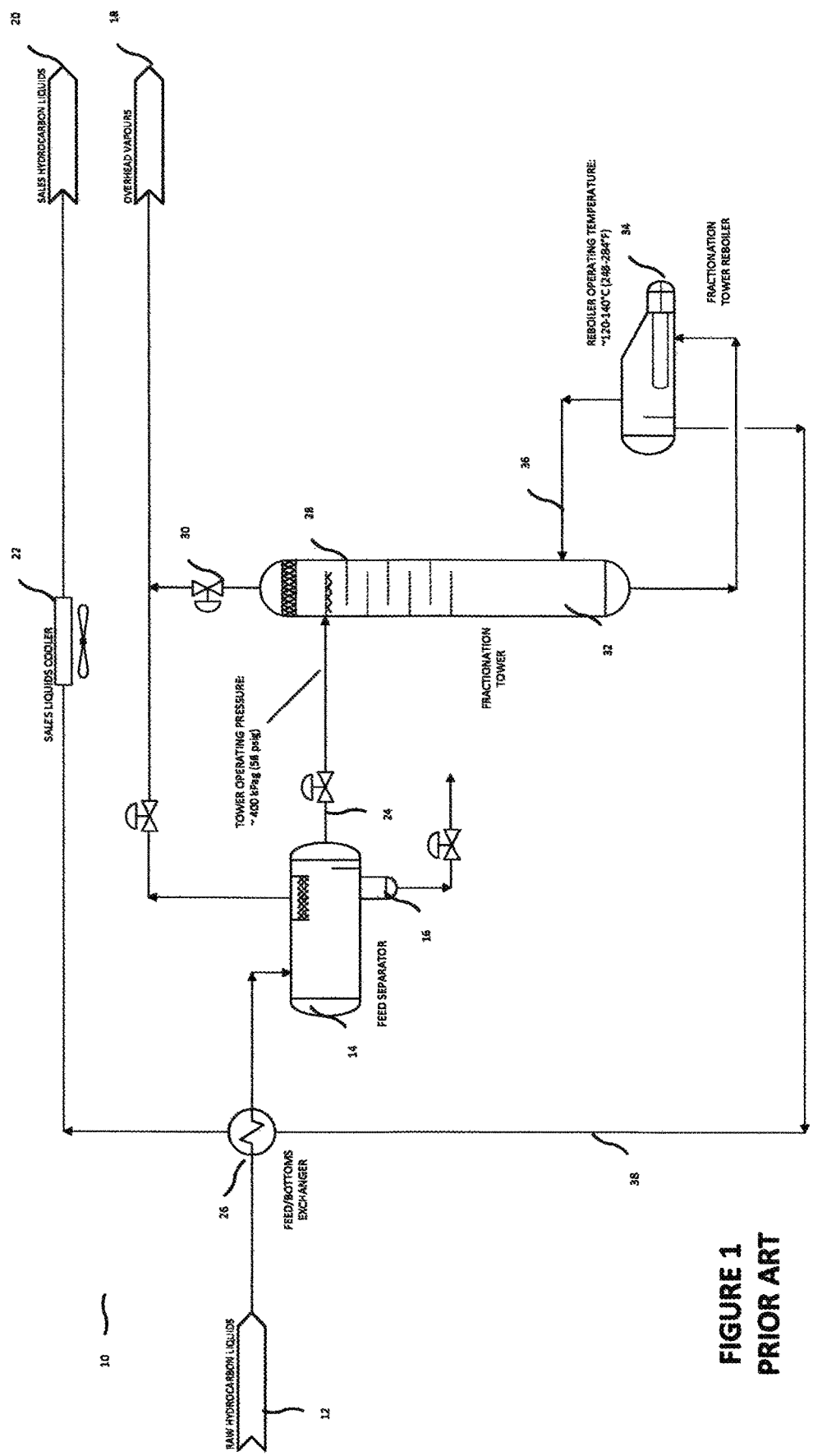
FIG. 1 is a schematic illustration of a prior art fractionating system.

Referring now to the Figures, FIG. 1 is a process flow diagram of a prior art fractionating circuit, generally denoted by numeral 10. In the circuit, the feed stream 12 composed of the raw hydrocarbons enters the feed/bottom exchanger 26 and subsequently into the feed separator 14 for initial processing.

Separated contaminants exit at 16 with overhead vapours 18 and saleable hydrocarbons 20 separated as well.

Further processing of the secondary feed stream 24 extends through to the fractionating tower 28. Overhead vapours are removed from fractionating tower 28 at 30. In the prior art example, the fractionating tower is typically operated at pressures between 40-70 psig.

Hydrocarbon material exiting the fractionating tower 28 at fractionating tower bottom 32 is circulated through reboiler 34 which typically operates at between 120° C. and 140° C. A recirculation loop 36 is provided as well as a removal loop 38 for saleable hydrocarbon removal.

Figure 2:
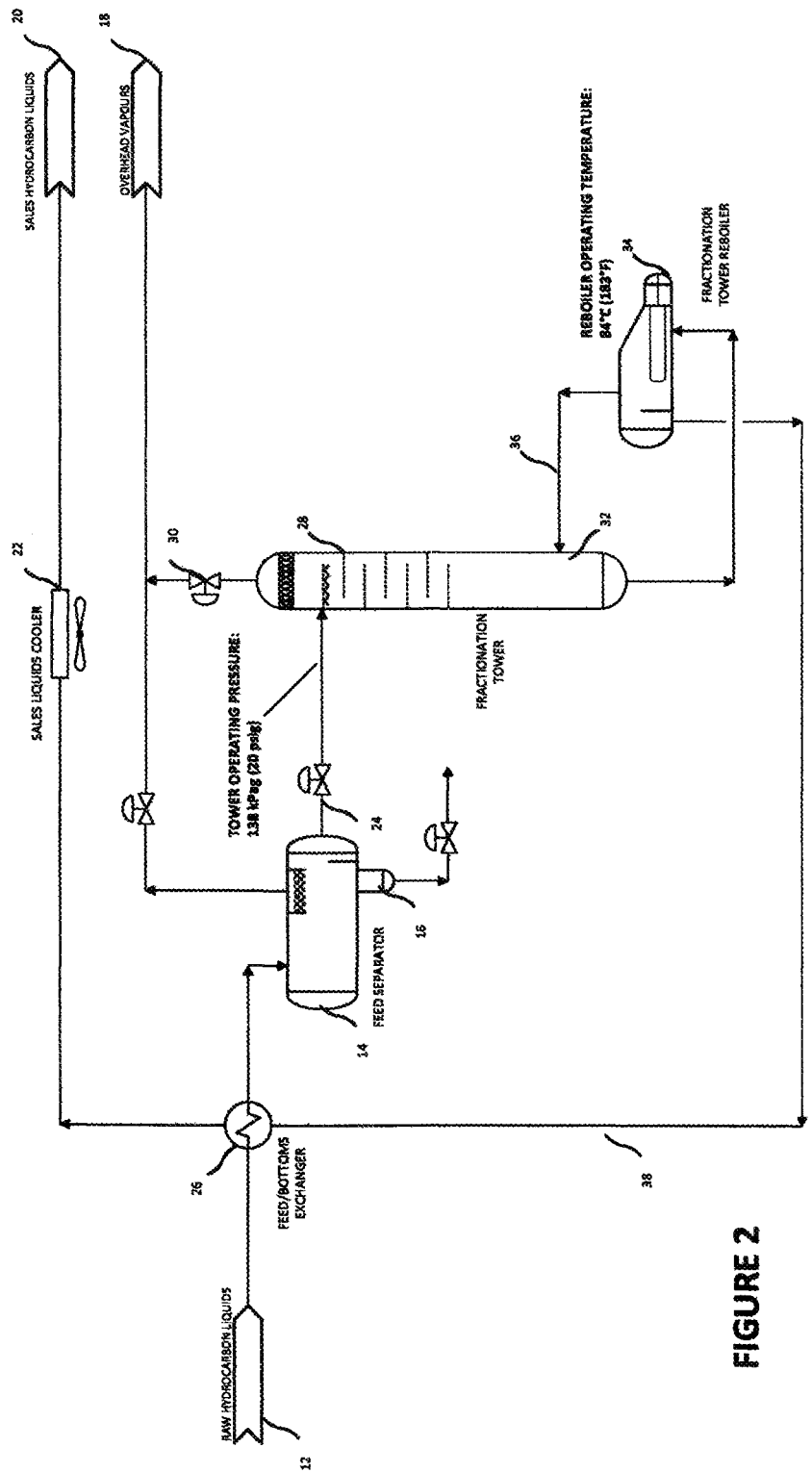
FIG. 2 is a schematic illustration of a first embodiment of the invention depicting the operating conditions for the fractionating circuit.

Turning to FIG. 2, an identical process flow diagram is presented; however, the difference relates to the operating parameters of the circuit. In this aspect of the invention, temperature and pressure in the circuit are modified together to prevent boiling of the feed stream which would result in precipitation of the salt on the heated surfaces in the circuit and thus fouling. In particular, the pressure in the fractionating tower 28 is modified as is the temperature in the reboiler 34.

Table 1 tabulates results demonstrating the benefits of varying the operating conditions on contaminant reduction.

TABLE 1

PRESSURE AND TEMPERATURE OPERATING CONDITIONS AND RESULTANT DEPOSITION

| Fractionating Tower Pressure (psig) | Reboiler Temperature (° C.) | Contaminant Deposited in Reboiler Shell (kg/d) |
|---|---|---|
| 1  | 56.0  | 17.1  |
| 5  | 66.0  | 66.3  |
| 10 | 75.0  | 250.0 |
| 20 | 88.5  | 521.1 |
| 30 | 98.0  | 663.9 |
| 40 | 106.0 | 761.9 |
| 50 | 113.0 | 832.3 |
| 60 | 119.0 | 880.3 |
| 70 | 124.5 | 918.2 |

These significant results clearly substantiate the benefit of manipulating pressure and temperature without unit operation interruption in the circuit. This is in contrast to what is practiced in the art which inherently includes shutdown to decontaminate components in the circuit. The present technology provides a more elegant and seamless solution to contaminant management without process upset or interruption.

Conveniently, by reducing the operating temperature and pressure conditions within the system, the possibility of chloride induced stress corrosion cracking (CISCC) due to the presence of contaminants in the system is also reduced.

For additional versatility in the methodology of the present invention, the fractionating tower 28 may be operated to create three phases, liquid, vapour and liquid water. Due to the intimate mixing between all three phases in the column, the ability of the water to remove contaminants found in the liquid stream is increased.

Figure 3:
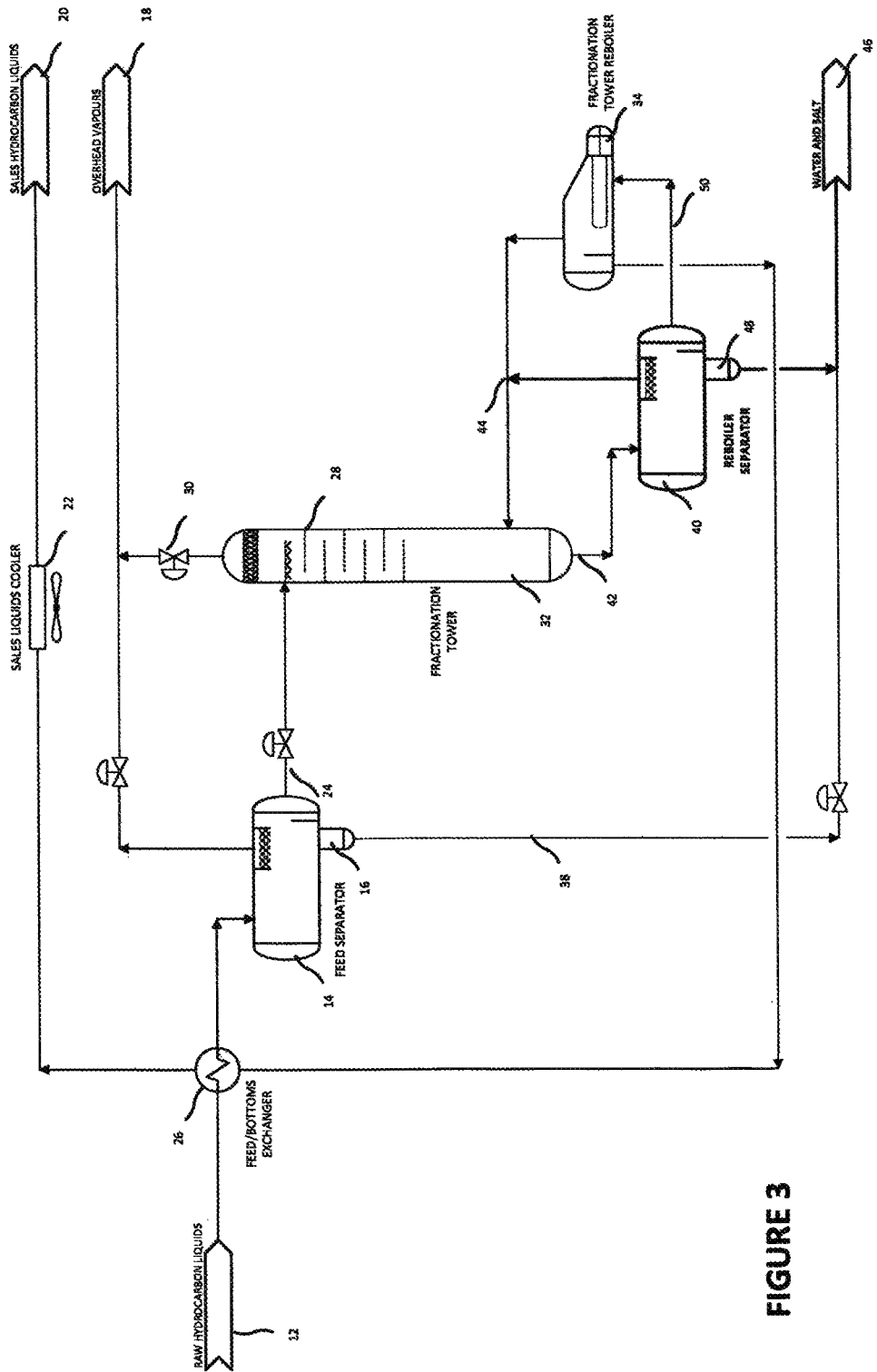
FIG. 3 is a schematic illustration of the addition of a reboiler separator.

Referring now to FIG. 3, shown is a further embodiment of the present invention. In this embodiment, a reboiler upstream separator 40 is included in the circuit. This provides for the separation and removal of contaminant and water from a hydrocarbon liquid stream being introduced to the fractionation circuit. The reboiler upstream separator 40 is positioned between fractionating tower bottoms outlet 32 and the reboiler 34. Bulk separation and removal of water and dissolved contaminants occurs in a three-phase separator 42 located on the column bottoms outlet 32 upstream of the reboiler 34 to further prevent the possibility of contaminants being deposited in the circuit. A recirculation loop 44 is provided between the separator 40 and bottoms outlet 32. Water and contaminants, denoted by numeral 46 are removed at 48. Cleaned feed stream is introduced from reboiler upstream separator 40 to reboiler 34 at 50.

TABLE 2

CONTAMINANT DEPOSITION WITH INCORPORATED REBOILER UPSTREAM SEPARATOR

| Stabilizer Tower Pressure (psig) | Reboiler Temperature (° C.) | Contaminant deposited in reboiler shell (kg/d) |
|---|---|---|
| 1 | 56 | 16.1 |
| 5 | 66 | 58.6 |
| 10 | 84 | 58.6 |
| 20 | 103.5 | 58.6 |
| 30 | 117 | 58.6 |
| 40 | 129 | 58.6 |
| 50 | 139 | 58.6 |
| 60 | 149 | 58.6 |
| 70 | 157 | 58.5 |

The data clearly demonstrates the benefits of adding a reboiler upstream separator for contaminant removal when considered in comparison to the data contained in Table 1.

Figure 4:
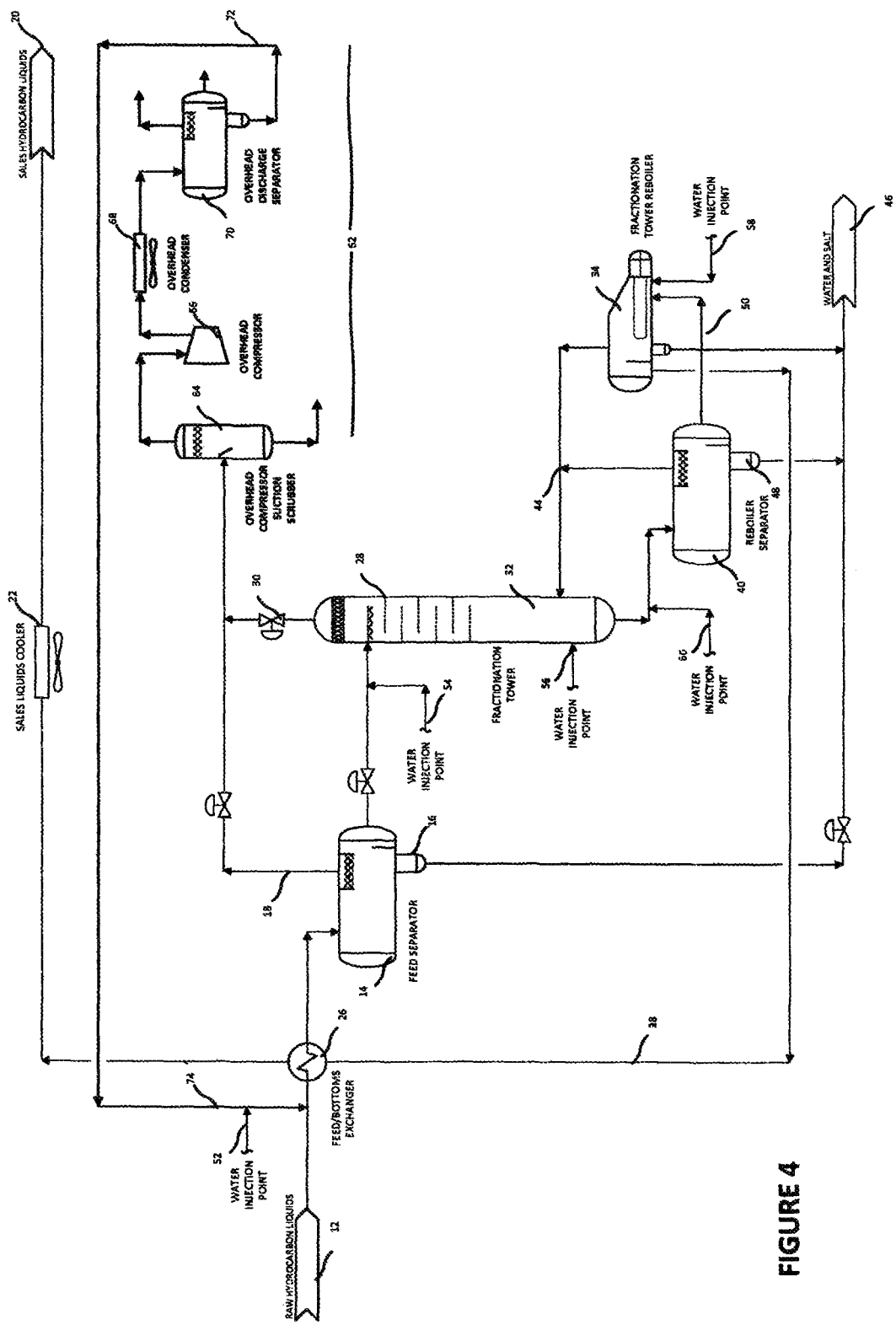
FIG. 4 is a schematic illustration of a fresh water injection system; and overhead water recycle system.

FIG. 4 illustrates further unit operations contributing to the effectiveness of the technology. For precautionary purposes, a fresh water injection system may be introduced in the event that a contaminant build-up has occurred in an existing fractionation system, such that the contaminant can be washed out and the water removed from the circuit to avoid corrosion in the column trays (not shown). As an example, water injection points include: upstream of the feed/bottoms exchanger 26 at 52, inlet to the fractionating column 28 at 54, at the column bottoms 32 at 56, at the inlet 58 to the reboiler 34 and inside the fractionating tower shell at 60.

Overhead vapours 18 exiting feed separator 14 may be treated in a scrubbing circuit 62 in which vapours 18 are fed into an overhead compressor suction scrubber 64, compressed with compressor 66 and passed into an overhead condenser 68. The condensate is then fed into a discharge separator 70 with condensate recirculated in circuit 72 to the raw hydrocarbon liquids 12. Further, overhead vapours from fractionating tower 28 exiting at 30 may be introduced into circuit 72 at 74. The condensate could be recirculated to any of the water injection points mentioned previously. The benefits of the water injection operations are evinced by the data presented in Tables 3 and 4.

TABLE 3

CONTAMINANT DEPOSITION WITH INCORPORATED WATER INJECTION AT POINT 54 OF FIG. 4 IN FEED/BOTTOMS EXCHANGER 26 OF FIG. 4

| Water Injection (bbl/d) | Contaminant deposited in exchanger (kg) |
|---|---|
| 0 | 11.4 |
| 10 | 9.5 |
| 25 | 7.6 |
| 50 | 5.7 |
| 100 | 3.8 |
| 200 | 2.28 |
| 300 | 1.63 |
| 400 | 1.26 |
| 500 | 1.03 |
| 600 | 0.87 |
| 700 | 0.77 |

The data demonstrates the benefits of water injection upstream of the feed/bottoms exchanger on contaminant removal.

TABLE 4

CONTAMINANT DEPOSITION WITH INCORPORATED WATER INJECTION AT POINT 58 OF FIG. 4 IN FRACTIONATION TOWER REBOILER 34 OF FIG. 4

| Water Injection (bbl/day) | Contaminant deposited in reboiler (kg) |
|---|---|
| 0 | 58.56 |
| 10 | 58.56 |
| 25 | 58.56 |
| 50 | 58.56 |
| 100 | 58.56 |
| 150 | 46.39 |
| 200 | 35.44 |
| 300 | 24.07 |
| 400 | 18.23 |
| 500 | 14.66 |
| 600 | 12.27 |
| 800 | 9.24 |
| 1000 | 7.42 |
| 1500 | 4.96 |

The data demonstrates the benefits of water injection in the fractionation tower reboiler on contaminant removal.

Figure 5:
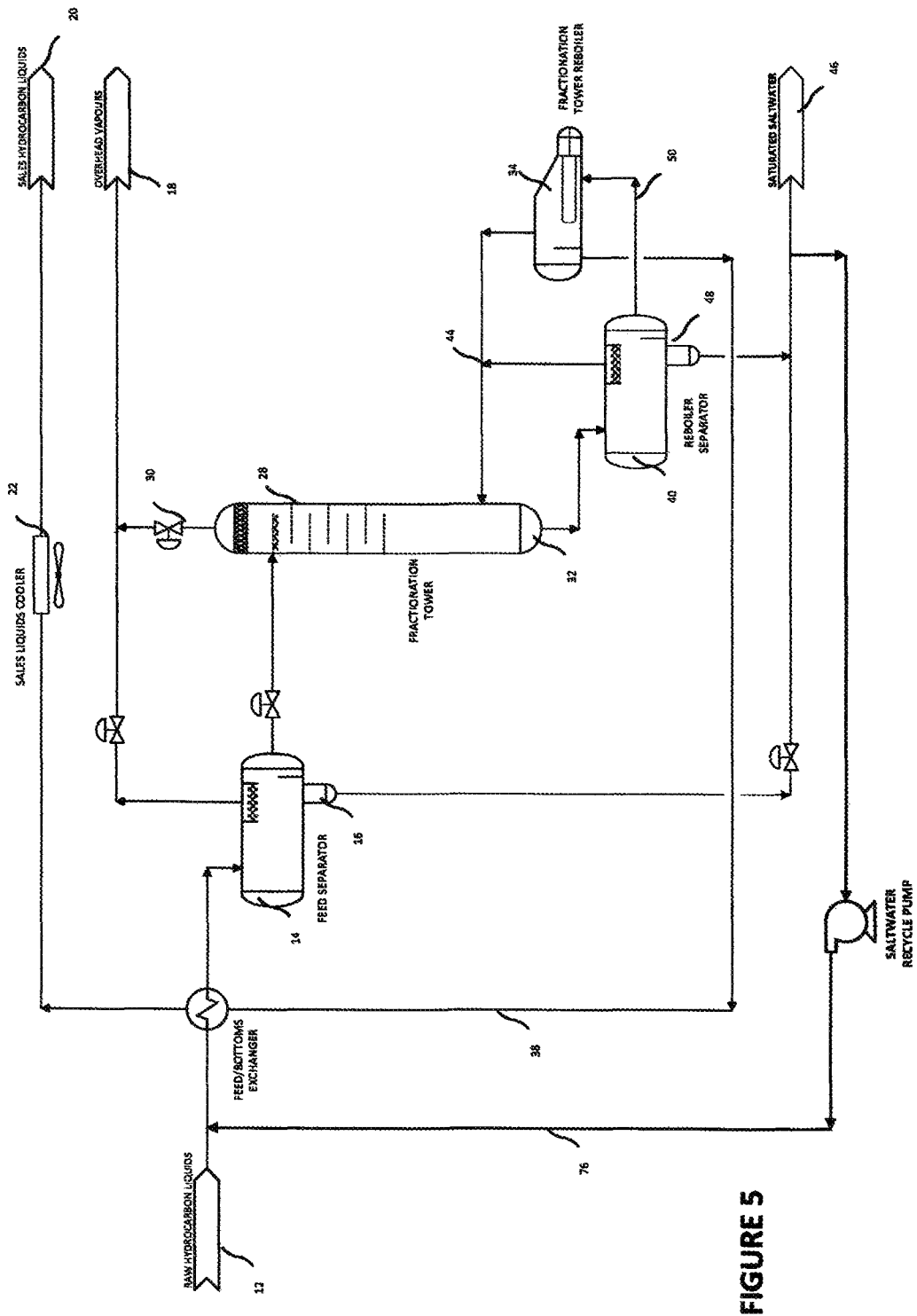
FIG. 5 is a schematic illustration of a water recycle system.

Referring now to FIG. 5, shown is a further embodiment of the invention where a water recycle circuit 76 is depicted. In this circuit, water may be introduced from the contaminant/water outlet 48 of the reboiler upstream separator 40, back to the inlet of the feed separator 14. If the water being removed from the process is not fully saturated with contaminant, recycling the water back to the inlet of the circuit facilitates more contaminant to be introduced into the water, further removing it from the circuit. Once the water from the bottom of the reboiler upstream separator 40 is fully saturated with contaminant, it can be removed.

In order to further augment deposition prevention, each component in the circuit prone to deposition may include fouling protection. This may take the form of an electrical or mechanical system or treatment. As an example, laser etching interior surfaces of components for hydrophobicity purposes may be used to ameliorate deposition. Other means for inducing or otherwise creating hydrophobic surfaces which are known in the art may be implemented to this end.

Regarding other features of the technology referenced herein, solubility enhancing additive(s) may be injected into the circuit to improve contaminant solubility in the water, leading to increased contaminant removal. Suitable additives will be appreciated by those skilled in the art.

For convenience, the injection sites may be those referenced in FIG. 4 regarding the fresh water wash.

Further, for even greater contaminant deposition protection, the deposition prone surfaces in the circuit may be coated with a compound(s) which resist the contaminant and thus fouling. As an example, thermoplastic polymers, polyphenylenesulfide (PPS) and polytetrafluoroethylene (PTFE)-blended PPS may be used as well as a host of other examples known in the art.

It will be understood that the features in FIGS. 2 through 5 may be practised singly or in numerous combinations. This will be determined by the practitioner.

We claim:

1. A method of extracting contaminants from a liquid hydrocarbon feed stream containing water, contaminants and mixtures thereof, comprising:

providing a fractionating circuit;
passing said liquid hydrocarbon feed stream into said fractionating circuit;
maintaining pressure and temperature in said circuit at levels suitable to prevent boiling of said water, contaminants and mixtures thereof from said liquid hydrocarbon feed stream;
isolating water, contaminant and mixtures thereof from liquid hydrocarbons from said liquid hydrocarbon feed stream after fractionation and
removing isolated water, contaminant and mixtures thereof from said circuit.

2. The method as set forth in claim 1, further including the step of providing a separator in said circuit for separating liquid hydrocarbons, contaminant and water.

3. The method as set forth in claim 1, further including the step of introducing fresh water at predetermined positions in said circuit.

4. The method as set forth in claim 2, further including the step of recycling contaminant rich water from said separator into said feed stream to be treated.

5. The method as set forth in claim 1, further including the step of introducing an additive to increase contaminant solubility in said feed stream.

6. The method as set forth in claim 1, further including the step of treating mechanical components in said fractionating circuit to reduce contaminant accretion.

7. The method as set forth in claim 6, wherein treating includes at least one of chemical and mechanical treatment.

8. The method as set forth in claim 1, further including the step of operating a fractionating column in said circuit in three phase mode to increase mixing for augmented contaminant removal.

9. The method as set forth in claim 7, further including the step of introducing fresh water at predetermined positions in said circuit.

10. The method as set forth in claim 2, further including the step of recycling separated contaminant rich water from said separator into said feed stream to be treated.

11. The method as set forth in claim 10, further including the step of introducing an additive to increase contaminant solubility in said feed stream.

12. The method as set forth in claim 1, wherein said contaminant includes at least one of salt and salt compounds.

13. The method as set forth in claim 1, further including practicing, in sequence with the method of claim 1, at least one of:
  A) step of providing a separator in said circuit for separating liquid hydrocarbons, contaminant and water;
  B) introducing fresh water at predetermined positions in said circuit;
  C) recycling separated contaminant rich water from said separator into said feed stream to be treated;
  D) introducing an additive to increase contaminant solubility in said feed stream;
  E) treating mechanical components in said fractionating circuit to reduce contaminant accretion;
  F) operating a fractionating column in said circuit in three phase mode to increase mixing for augmented contaminant removal; and
  G) treating overhead vapours evolving from said fractionating circuit.

14. A method of reducing salt fouling from a feed stream containing liquid hydrocarbons, salt and water in a fractionating circuit having a feed separator, tower and reboiler, comprising:
feeding said feed stream into said feed separator to form a secondary feed stream;
feeding said secondary feed stream into said tower; and
maintaining pressure in said tower and temperature in said fractionating tower reboiler to prevent boiling of water in said secondary feed stream.

15. The method as set forth in claim 14, further including the step of introducing a second separator between a bottom of said tower and said fractionating tower reboiler for ancillary removal of salt and water from said secondary feed stream.

16. The method as set forth in claim 14, further including the step of injecting fresh water at predetermined positions in said circuit.

17. The method as set forth in claim 16, wherein said predetermined positions include after said feed separator.

18. The method as set forth in claim 16, wherein said predetermined positions include in said secondary feed stream prior to introduction into said tower.

19. The method as set forth in claim 16, wherein said predetermined positions include in said tower at a bottom thereof.

20. The method as set forth in claim 16, wherein said predetermined positions include adjacent an inlet of said secondary separator.

21. The method as set forth in claim 16, wherein said predetermined positions include at said reboiler.

22. The method as set forth in claim 15, further including the step of recycling salt water from said second separator to said feed stream.

23. Fractionating apparatus circuit for extracting contaminant from a feed stream containing liquid hydrocarbons, contaminant and water, said apparatus including a fractionating tower, a feed separator and reboiler comprising:
a reboiler separator positioned in fluid communication with said fractionating tower and said reboiler.

24. Fractionating apparatus circuit for extracting contaminant from a feed stream containing liquid hydrocarbons, contaminant and water, comprising:
a feed separator for initial separation of contaminant from said feed stream;
a fractionating tower for hydrocarbon separation;
a feed bottom exchanger for conditioning said feed stream prior to treatment in said fractionating tower;
a reboiler for maintaining temperature in said circuit; and
a secondary separator in fluid communication with said reboiler and the bottom of said fractionating tower.

25. The fractionating apparatus as set forth in claim 24, further including water injection points at predetermined areas in said circuit.

26. The fractionating apparatus as set forth in claim 24, further including a contaminant water recycle circuit between an output of said secondary separator and said feed separator.

27. The fractionating apparatus as set forth in claim 24, further including a wash circuit at said reboiler for recycling water separated in said secondary separator to said feed bottom exchanger.

28. The fractionating apparatus as set forth in claim 24, further including a fractionating tower overhead vapour treatment circuit.

* * * * *